10 # United States Patent Office 3,294,861
Patented Dec. 27, 1966

3,294,861
FABRIC OF IMPROVED SOLVENT RINGING
PROPERTIES
Billy G. Simpson, Greensboro, N.C., assignor to Dow
Corning Corporation, Midland, Mich., a corporation of
Michigan
No Drawing. Filed June 1, 1964, Ser. No. 371,808
4 Claims. (Cl. 260—827)

This invention relates to silicone treated fabrics having improved solvent ringing properties.

It is well known that various organosiloxanes can be applied to fabrics to render them water repellent. This has the advantage particularly with upholstery, of reducing the staining of the fabric by water borne materials. For this reason, silicone treated fabrics have enjoyed wide commercial acceptability. However, they have been plagued with a problem which has heretofore not been fully solved and that is the problem of solvent ringing. This occurs when an organic solvent is applied to the fabric. The solvent migrates outwardly from the area of application. When the solvent evaporates, a permanent ring is left around the area of application which, depending upon the fabric used, can be quite unsightly. In fact, the ringing can be so bad in some cases it is best to allow grease spots to remain on the fbaric rather than try to remove them. Many attempts have been made in the past to remedy this situation by altering the composition of the siloxane or by varying the cure. Some of these have been partially satisfactory.

Applicant has discovered a new method of reducing the present solvent ringing by employing a combination of organosiloxane water repellents with the organic resins hereinafter described.

In addition to the absence of solvent ringing, the fabrics of this invention do not water spot, that is, water allowed to dry on the fabric does not leave an unsightly spot which is difficult or impossible to remove. A fabric which water spots is not satisfactory even though it may be free from solvent ringing. This is particularly true for automotive upholstery where the fabric often becomes wet from rain.

It is the object of this invention to provide a water repellent fabric which does not give solvent ringing when cleaned with an organic solvent nor will it water spot. Other objects and advantages will be apparent from the following description.

This invention relates to a mixture of
(1) a curable methylpolysiloxane and
(2) a copolymer of
   (a) N-vinyl pyrrolidone and
   (b) a material selected from the group styrene, vinyl acetate, and alkyl esters of acrylic acid,
the ratio of (a) and (b) in (2) being from 10:90 to 90:10 by weight and the ratio of (1) to (2) being from 1 part by weight siloxane to 10 parts by weight (2) to about 1 part by weight siloxane per part by weight (2).

For the purpose of this invention the curable methylpolysiloxane can be any of the methylpolysiloxanes which are normally applied to fabrics. As is well known, these include methylhydrogenpolysiloxane, dimethylpolysiloxane, copolymers of the same, copolymers of dimethysiloxane, monomethylsiloxane and trimethylsiloxane; copolymers of trimethylsiloxane and dimethylsiloxane; copolymers of dimehtylsiloxane and HiSO₃/₂; copolymers of dimethylsiloxane and SiO₄/₂, and mixtures of any of the above.

The term "curable" as used herein means that the methylpolysiloxane can be cured on the fabric at temperatures at which the fabric does not degrade. The method of cure it not critical and can be accomplished by any suitable means. The best commercial means at present is to employ catalysts such as alkyl titanates or metal salts of carboxylic acids which causes curing of the siloxane at reasonably low temperatures.

Ingredient (2) of this invention are commercially available materials and consist of copolymers of vinyl pyrrolidone with styrene, copolymers of vinyl pyrrolidone with vinyl acetate, or copolymers of vinyl pyrrolidone of alkyl esters of acrylic acid such as copolymers of vinyl pyrrolidone with methyl acrylate, copolymers of vinyl pyrrolidone with ethyl acrylate, copolymers of vinyl pyrrolidone with octyl acrylate, and copolymers of vinyl pyrrolidone with stearyl acrylate. The preferred species are the copolymers of vinyl pyrrolidone with styrene.

For the purpose of this invention the composition of these copolymers can vary from 10% by weight pyrrolidone to 90% by weight pyrrolidone, the remainder being composed of the other vinyl monomers. If desired, of course, copolymers containing more than two ingredients can be used such as, for example, copolymers of vinyl pyrrolidone, styrene, and ethyl acrylate in which the vinyl pyrrolidone composes from 10 to 90% by weight of the total copolymer.

The mixtures of this invention can be applied to the fabric in any convenient method such as by dipping, spraying, or padding. Also, the copolymers can be applied in any convenient form such as water dispersions or solvent solutions. Normally, water dispersions are preferred. Also the materials can be applied to the fabric in any order, although it is preferred that the materials be mixed before application to the fabric.

For the purpose of this invention the total amount of the mixture applied to the fabric should range from .2 to 2% based on the weight of the fabric. After the mixture has been applied to the fabric, the fabric is dried in the conventional manner.

The compositions of this invention can be applied to any fabric such as cotton, wool, silk, rayon, acetate, polyamide fabrics, polyester fabrics, polyacrylonitrile fabrics, polyvinyl chloride-vinylidene chloride fabrics and glass fabrics.

The solvent ringing of the fabrics of this invention was determined by the following tests. 1 cc. of a solvent composed of 3 parts by weight petroleum ether and 1 part 1,1,1-trichloroethane, were dropped on the fabric and dried overnight. The fabric was then examined for any ring formation.

Water spotting was checked by dropping 10 drops of distilled water onto the treated fabric and allowing the water to dry and then examining the fabric for any color change or water spotting.

The following examples are illustrative only and should not be construed as limiting the invention which is properly delineated in the appended claims.

*Example 1*

A water dispersion was prepared containing (1) .3% by weight of a mixture of 80% by weight methylhydrogen-siloxane and 20% by weight of a hydroxylated dimethylpolysiloxane, which mixture contained a small amount of a mixture of triethanolamine titanate and zinc acetate as a catalyst and (2) .4% by weight of a copolymer of N-vinyl pyrrolidone and styrene, sold under the name "Polectron 430" by General Aniline and Film Corporation. An acrylic backed rayon automotive upholstery fabric was immersed in this dispersion. The fabric was then removed, dried and cured 5 minutes at 350° F. The resulting fabric did not water spot and did not solvent ring according to the above test. By contrast, an identical fabric treated with the siloxane mixture alone gave severe ringing under the above test.

Example 2

The above experiment was repeated except that the water dispersion contained .3% by weight of the siloxane and 2.56% by weight of the vinyl pyrrolidone styrene copolymer. The results obtained were equivalent.

Example 3

Experiment 1 was repeated except that the water dispersion contained .3% by weight siloxane and .64% by weight of the vinyl pyrrolidone styrene copolymer. The results were equivalent.

Example 4

Improved solvent ringing is obtained when polyamide, polyester, cotton, wool, and glass fabrics are employed in the procedure of Example 1.

Example 5

Improved solvent ringing is obtained when the following copolymers are substituted for (2) in Example 1. 35% vinyl pyrrolidone and 65% vinylacetate, 75% vinyl pyrrolidone and 25% ethyl acrylate, 50% vinylpyrrolidone and 50% octyl acrylate. All percentages are by weight.

Example 6

Equivalent results are obtained when the following siloxane compositions are substituted for (1) in Example 1.

A mixture of 40 weight percent methylhydrogensiloxane and 60 weight percent of a hydroxylated dimethylsiloxane, Methylhydrogenpolysiloxane, A copolymer of dimethylsiloxane, trimethylsiloxane and $HSiO_{3/2}$, A copolymer of dimethylsiloxane and monomethylsiloxane containing 3% by weight silicon-bonded hydroxyl groups and having a viscosity of 35 cs. at 25° C.

That which is claimed is:

1. A composition of matter consisting essentially of a mixture of
   (1) a curable methylpolysiloxane and
   (2) a copolymer of
      (a) N-vinyl pyrrolidone and
      (b) a material selected from the group consisting of styrene, vinyl acetate and alkyl esters of acrylic acid, the proportions of (a) and (b) in (2) being from 10:90 to 90:10 by weight and the proportions of (1) and (2) being from 1 part (1) per 10 parts (2) to about 1 part (1) per part (2) based on parts by weight.

2. The composition in accordance with claim 1 where (2) is a copolymer of N-vinyl pyrrolidone and styrene.

3. An article of manufacture comprising a fabric coated with from .2 to 2% by weight based on the weight of the fabric of a composition consisting essentially of
   (1) a cured methylpolysiloxane and
   (2) a copolymer of
      (a) N-vinyl pyrrolidone and
      (b) a material selected from the group consisting of styrene, vinyl acetate and alkyl esters of acrylic acid, the proportions of (a) and (b) in (2) being from 10:90 to 90:10 by weight and the proportions of (1) and (2) being from 1 part (1) per 10 parts (2) to about 1 part (1) per part (2) based on parts by weight.

4. The article in accordance with claim 3 in which (2) is a copolymer of N-vinyl pyrrolidone and styrene.

References Cited by the Examiner

UNITED STATES PATENTS 2,833,735   5/1958   Nitzsche et al. _____ 260—825

SAMUEL H. BLECH, *Primary Examiner.*